United States Patent
Hayashi

(10) Patent No.: US 9,190,884 B2
(45) Date of Patent: Nov. 17, 2015

(54) ELECTRIC ACTUATOR

(71) Applicant: DENSO CORPORATION, Kariya, Aichi-pref. (JP)

(72) Inventor: Hideki Hayashi, Takahama (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/186,588

(22) Filed: Feb. 21, 2014

(65) Prior Publication Data

US 2014/0311262 A1 Oct. 23, 2014

(30) Foreign Application Priority Data

Apr. 19, 2013 (JP) .................................. 2013-88477

(51) Int. Cl.

| F16H 27/02 | (2006.01) |
|---|---|
| F16H 29/02 | (2006.01) |
| F16H 29/20 | (2006.01) |
| H02K 7/116 | (2006.01) |
| F16C 35/02 | (2006.01) |
| F16H 57/021 | (2012.01) |

(52) U.S. Cl.
CPC .............. H02K 7/1166 (2013.01); F16C 35/02 (2013.01); *F16H 2057/0213* (2013.01); *Y10T 74/18792* (2015.01)

(58) Field of Classification Search
CPC .......... F16H 2057/0213; F16H 57/021; F16H 2025/209; F16H 2057/02034; H02K 7/081
USPC ............... 74/89.14, 425, 427; 310/12.31, 425
See application file for complete search history.

(56) References Cited

U.S. PATENT DOCUMENTS

| 5,020,211 | A | * | 6/1991 | Nakagawa et al. | ............. | 29/596 |
| 5,994,807 | A | * | 11/1999 | Coles et al. | ..................... | 310/83 |
| 6,477,763 | B1 | * | 11/2002 | Santander et al. | ............. | 29/597 |
| 6,750,574 | B2 | * | 6/2004 | Okazaki et al. | ............ | 310/68 B |
| 6,763,738 | B1 | * | 7/2004 | Tsutsui et al. | ........... | 74/388 PS |
| 8,304,955 | B2 | * | 11/2012 | Suzuki et al. | ................. | 310/257 |
| 2002/0024265 | A1 | * | 2/2002 | Mayumi | ....................... | 310/179 |
| 2005/0161277 | A1 | * | 7/2005 | Bock et al. | .................... | 180/400 |
| 2009/0026855 | A1 | * | 1/2009 | Kasai | .............................. | 310/42 |

(Continued)

FOREIGN PATENT DOCUMENTS

| JP | H10-243597 A | 9/1998 |
| JP | 2010-142340 A | 7/2010 |

(Continued)

OTHER PUBLICATIONS

Office Action issued Feb. 17, 2015 in corresponding JP Application No. 2013-088477 (with English translation).

*Primary Examiner* — William Kelleher
*Assistant Examiner* — Jake Cook

(57) ABSTRACT

A worm gear unit is fitted to an output shaft of a motor rotation unit. A bearing supports the output shaft rotatably and makes contact with the worm gear unit, which is applied with thrust load and moved to an other side. A yoke has a bottom portion surrounding the motor rotation unit on one side and having a shaft hole through which the output shaft passes. An axial hollow is formed in the bottom portion by press working to be coaxial with the shaft hole and to open on the one side to accommodate the bearing. A projected piece is formed simultaneously with the axial hollow in the press working. The projected piece is projected inward in a radial direction toward the axial hollow and located between the motor rotation unit and the bearing in the axial direction.

5 Claims, 3 Drawing Sheets

ONE END ←——→ OTHER END
AXIAL DIRECTION

(56) References Cited

U.S. PATENT DOCUMENTS

| | | | | |
|---|---|---|---|---|
| 2009/0127955 A1* | 5/2009 | Kasai | | 310/90 |
| 2010/0289385 A1* | 11/2010 | Smirnov et al. | | 310/425 |
| 2011/0285229 A1* | 11/2011 | Yamaki et al. | | 310/83 |
| 2012/0194018 A1* | 8/2012 | Miyauchi et al. | | 310/77 |
| 2012/0217085 A1* | 8/2012 | Sekikawa | | 180/444 |
| 2013/0147295 A1* | 6/2013 | Shimizu | | 310/90 |

FOREIGN PATENT DOCUMENTS

| | | |
|---|---|---|
| JP | 2011-109862 A | 6/2011 |
| JP | 2012-250016 A | 12/2012 |
| JP | 2014-099987 A | 5/2014 |

* cited by examiner

ONE END ←→ OTHER END
AXIAL DIRECTION

ONE END ←→ OTHER END
AXIAL DIRECTION

ELECTRIC ACTUATOR

CROSS REFERENCE TO RELATED APPLICATION

This application is based on reference Japanese Patent Application No. 2013-88477 filed on Apr. 19, 2013, the disclosure of which is incorporated herein by reference.

TECHNICAL FIELD

The present disclosure relates to an electric actuator. For example, the present disclosure may relate to a worm-gear type electric actuator configured to decelerate an output of an electric motor by using a worm gear and to output a torque of the electric motor.

BACKGROUND

Conventionally, an electric actuator may have a configuration including a worm gear, which is equipped directly to an output shaft of a motor to reduce its size. In the configuration, in which a worm gear is directly equipped to an output shaft of a motor, a thrust load is transmitted from a worm wheel. Thus, the thrust load is directly transmitted to the output shaft. Therefore, the output shaft is intensely urged with the thrust load in the axial direction. Therefore, the output shaft and the worm gear may be moved with the thrust load in the axial direction. In consideration of the present state, an additional configuration is needed to regulate movement of the output shaft and the worm gear.

For example, Patent Document 1 discloses a configuration in which a collar-shaped thrust support portion is equipped to a worm gear. The thrust support portion is greater than a thread of the worm gear in diameter. The thrust support portion is equipped with first and second thrust bearings on both sides in the axial direction to regulate movement of the output shaft and the worm gear. It is noted that, the configuration of the Patent Document 1 needs a special worm gear including the thrust support portion, in addition to the first and second thrust bearings. Accordingly, the configuration of Patent Document 1 may incur additional cost.

Alternatively, another configuration is conceivable in which, as shown in FIG. 4, a worm gear unit 101 is regulated from moving in the axial direction of to an other side. Specifically, the configuration of FIG. 4 enables a worm gear unit 101 to make contact with a bearing 103 of a motor 102 in the axial direction, thereby to regulate movement of the worm gear unit 101 toward the other side in the axial direction. It is noted that, movement of the worm gear unit 101 to the one side in the axial direction may be regulated with, for example, a regulating member 104. The regulating member 104 is a separate component from an electric actuator 100 and is fixed to the one side of the worm gear unit 101 in the axial direction.

It is noted that, in the configuration, the worm gear unit 101 makes contact with the bearing 103 to move the bearing 103 toward an armature coil 105. Consequently, a thrust clearance between the bearing 103 and the armature coil 105 may be eliminated to lock rotation of the motor 102. In consideration of this, it is further conceivable to provide a bearing retainer configuration, which retains the bearing 103 around the armature coil 105 in order not to enable the bearing 103 to move toward the armature coil 105. The bearing retainer configuration may be provided by, for example, crimping the yoke 106 and/or welding a separate component on the yoke 106. It is further noted that, the additional bearing retainer configuration may also incur additional cost.

Patent Document 1

Publication of Unexamined Japanese Patent Application 2011-109862

SUMMARY

It is an object of the present disclosure to produce a worm-gear type electric actuator including a configuration to regulate movement of a worm gear in the axial direction when making contact with a bearing of a motor and a retainer configuration for the bearing at low cost.

According to an aspect of the present disclosure, an electric actuator comprises a motor rotation unit integrated with an output shaft of an electric motor to form a rotor of the electric motor. The electric actuator further comprises a worm gear unit fitted to a first portion of the output shaft, the first portion being projected from the motor rotation unit to one side in an axial direction. The worm gear unit is configured to receive thrust load from a worm wheel in an axial direction. The electric actuator further comprises a bearing located between the motor rotation unit and the worm gear unit in the axial direction and configured to support the output shaft rotatably. The bearing is further configured to make contact with the worm gear unit when the worm gear unit is applied with thrust load transmitted to the worm gear unit to move to an other side in the axial direction. The electric actuator further comprises a yoke having a bottom portion, the bottom portion surrounding the motor rotation unit on the one side in the axial direction and having a shaft hole through which the output shaft passes. The electric actuator further comprises an axial hollow being a dent formed by press working in the bottom portion to be coaxial with the shaft hole and to open on the one side in the axial direction. The axial hollow is press-fitted with the bearing to accommodate the bearing. The electric actuator further comprises a projected piece being a part of the yoke and formed by the press working simultaneously with the axial hollow. The projected piece is projected inward in a radial direction toward the axial hollow to define an inner circumferential periphery of the shaft hole. The projected piece is located between the motor rotation unit and the bearing in the axial direction.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, an electric actuator according to embodiments will be described.

Embodiments

Configuration of First Embodiment

Figure 1:
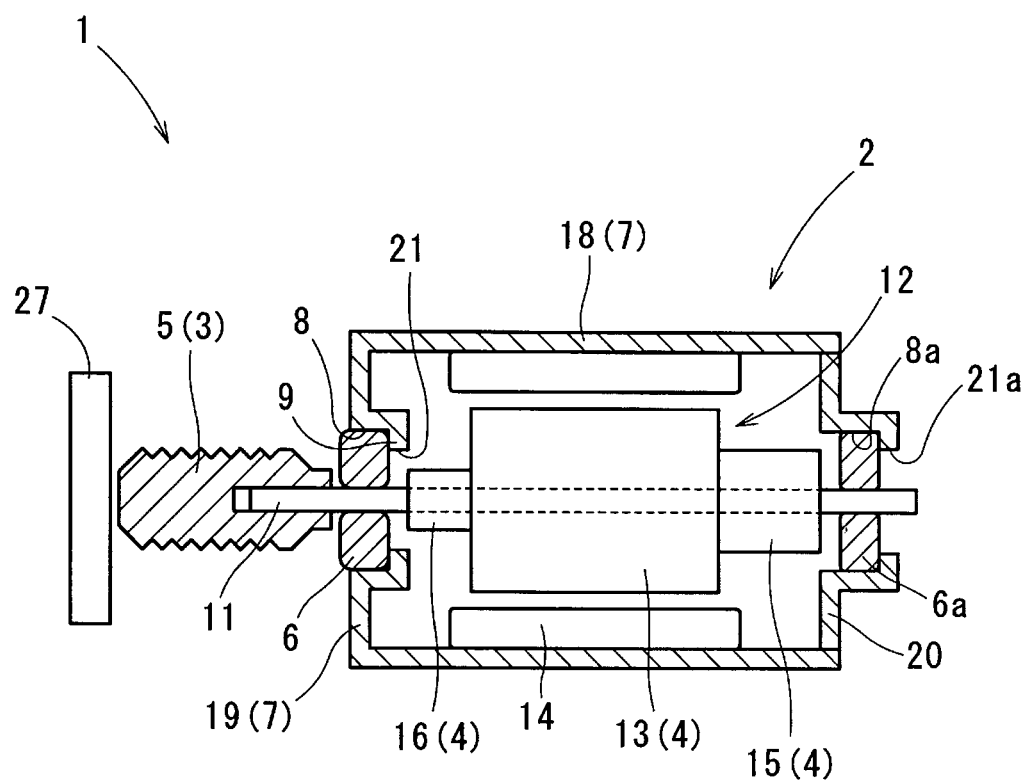
FIG. 1 is a partial sectional view showing an electric actuator according to a first embodiment.

A configuration of an electric actuator (actuator device) 1 according to a first embodiment will be described with reference to FIG. 1. The actuator device 1 causes a worm gear 3 to decelerate output of an electric motor 2 and to transmit a torque generated by the electric motor 2. The actuator device 1 includes a motor rotation unit 4, a worm gear unit 5, a bearing 6, a yoke 7, an axial hollow 8, and a projected piece 9.

The motor rotation unit 4 is integrated with an output shaft 11 of the electric motor 2 and functions as a rotor 12 of the electric motor 2. The electric motor 2 is, for example, a small-sized direct-current motor. The electric motor 2 includes an armature coil 13, magnetic poles 14, and a commutator 15. The armature coil 13 is supplied with electricity through a brush (not shown). The rotor 12 is configured with the output shaft 11, the armature coil 13, the commutator 15, and the like. The motor rotation unit 4 is configured with the armature coil 13 and the commutator 15.

The worm gear 3 is configured with the worm gear unit 5 and a worm wheel (not shown). The worm gear unit 5 is fitted to a portion of the output shaft 11, which is projected from the motor rotation unit 4 toward one side in the axial direction. The worm gear unit 5 is applied with a thrust load from the worm wheel in the axial direction.

The bearing 6 is located between the motor rotation unit 4 and the worm gear unit 5 in the axial direction. The bearing 6 is located on the one side of the motor rotation unit 4 in the axial direction to support the output shaft 11 rotatably. In consideration of a manufacturing cost, for example, an impregnated bearing may be employed as the bearing 6. The worm gear unit 5 is applied with the thrust load to move toward the other side in the axial direction. Thus, the worm gear unit 5 makes contact with the bearing 6.

The output shaft 11 is projected from the motor rotation unit 4 further toward the other side in the axial direction. The output shaft 11 has a portion projected toward the other side in the axial direction, and the portion of the output shaft 11 is equipped with a bearing 6a. Thus, the output shaft 11 is supported rotatably on both the one side of the motor rotation unit 4 and the other side of the motor rotation unit 4 in the axial direction. In consideration of a manufacturing cost, for example, an impregnated bearing may be employed as the bearing 6a. A spacer 16 is located between the bearing 6 and the armature coil 13. The spacer 16 is configured to adjust an overlap between the armature coil 13 and the magnetic poles 14 in the axial direction. The spacer 16 is one component of the rotor 12 and is include in the motor rotation unit 4.

The yoke 7 forms an outer shell of the electric motor 2. The yoke 7 includes a lateral side 18 and a bottom portion 19. The lateral side 18 is in a tubular shape and surrounds the outer circumferential periphery of the motor rotation unit 4. The bottom portion 19 is located on the one side of the motor rotation unit 4 in the axial direction to surround the one side of the motor rotation unit 4. The lateral side 18 has an inner circumferential periphery equipped with permanent magnets, which function as the magnetic poles 14. The motor rotation unit 4 is surrounded with an end bell 20 on the other side in the axial direction. The bottom portion 19 and the end bell 20 have shaft holes 21 and 21a, respectively. The output shaft 11 passes through the shaft holes 21 and 21a.

The axial hollow 8 is a dent formed in the bottom portion 19. The axial hollow 8 is formed by press working to be coaxial with the shaft hole 21. The axial hollow 8 is dented toward the other side in the axial direction and is opened on the one side in the axial direction. The bearing 6 is press-fitted into the axial hollow 8. One end of the bearing 6 in the axial direction is projected from the axial hollow 8 toward the one side in the axial direction. The end bell 20 has a hollow 8a similarly to the bottom portion 19. The bearing 6a is press-fitted in the hollow 8a.

Figure 2A:
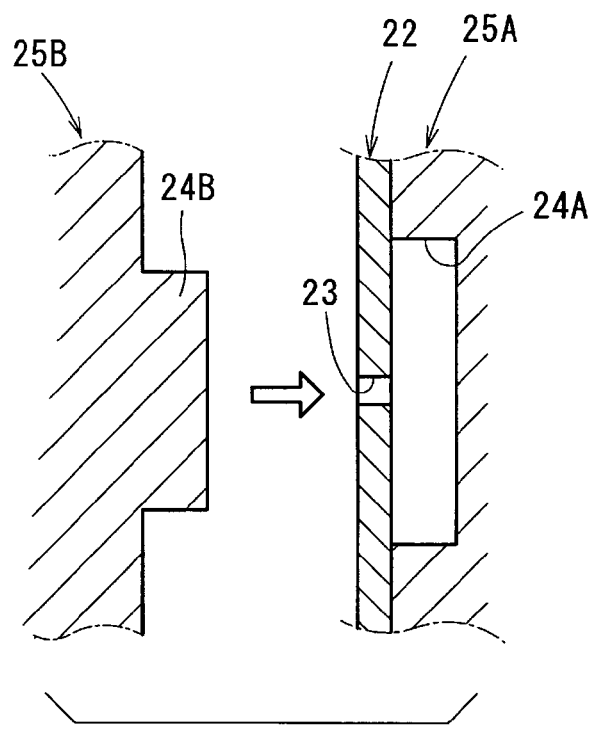
FIGS. 2A to 2C show a press working process to form an axial hollow and a projected piece according to the first embodiment.
Figure 2B:
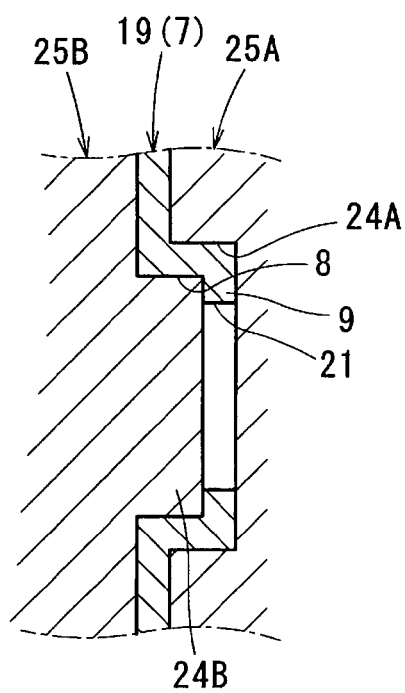
Figure 2C:
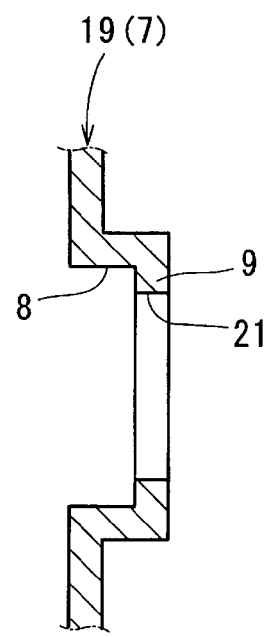

The projected piece 9 is a part of the yoke 7. The projected piece 9 is formed simultaneously with the yoke 7 in the press working to form the axial hollow 8. The projected piece 9 is projected inward in the radial direction toward the axial hollow 8 to form an inner circumferential periphery end of the shaft hole 21. The projected piece 9 is located between the motor rotation unit 4 and the bearing 6 in the axial direction. As follows, one example of a process to form the projected piece 9 will be described with reference to FIGS. 2A to 2B. FIG. 2A shows a material of the yoke 7 before the press working is conducted to from the yoke 7. FIG. 2B shows the axial hollow 8 and the projected piece 9 formed by the press working and before being removed from dies 25A and 25B. FIG. 2C shows the axial hollow 8 and the projected piece 9 after being removed from the dies 25A and 25B.

As shown in FIG. 2A, the material of the yoke 7 before the press working includes a material portion 22. The material portion 22 forms the bottom portion 19 after the press working. The material portion 22 has a small diameter hole 23, which is significantly smaller than the shaft hole 21 in radius. As shown in FIG. 2B, the press working is implemented on the material portion 22 to form the axial hollow 8 and the projected piece 9. As shown in FIGS. 2A, 2B, and 2C, the press working is implemented by using the dies 25A and 25B. Specifically, the dies 25A and 25B have a recess 24A and a protrusion 24B, respectively. The hole 23 is pressed between the recess 24A and the protrusion 24B to form the axial hollow 8 and the projected piece 9 to be coaxial with each other.

The projected piece 9 forms a bearing retainer structure to retain the bearing 6 on the side of motor rotation unit 4. The projected piece 9 retains the bearing 6 on the other side in the axial direction. In the present configuration, when the worm gear unit 5 is applied with a thrust load to move toward the other side in the axial direction and when the worm gear unit 5 makes contact with the bearing 6 accordingly, the projected piece 9 retains the bearing 6. Thus, the projected piece 9 regulates movement of the bearing 6 to the other side in the axial direction. Movement of the worm gear unit 5 to the one side in the axial direction may be regulated with, for example, a regulating member 27. The regulating member 27 is a separate component from the actuator device 1 and is located and fixed on the one side of the worm gear unit 5 in the axial direction.

Operation Effect of First Embodiment

The actuator device 1 according to the first embodiment forms the bearing retainer structure mainly with the axial hollow 8 and the projected piece 9. The axial hollow 8 is a dent formed in the bottom portion 19. The axial hollow 8 accommodates the bearing 6, which is press-fitted into the axial hollow 8. The axial hollow 8 is formed by press working to be coaxial with the shaft hole 21. The axial hollow 8 opens on the one side in the axial direction. The projected piece 9 is a part of the yoke 7. The projected piece 9 is formed simultaneously with the yoke 7 in the press working to form the axial hollow 8. The projected piece 9 is projected inward in the radial direction toward the axial hollow 8 to form the inner circumferential periphery end of the shaft hole 21. The projected piece 9 is located between the motor rotation unit 4 and the bearing 6 in the axial direction.

With the present configuration, the axial hollow 8 and the projected piece 9 can be formed by press working to be core components of the bearing retainer structure. In this way, the bearing retainer structure can be provided in the actuator device 1 without increase in manufacturing cost. It is noted that, in a case where an impregnated bearing is employed as the bearing 6, the output shaft 11 is easily slidable relative to the bearing 6. Therefore, in this case, when the worm gear unit 5 makes contact with the bearing 6, the worm gear unit 5 tends to exert large force onto the bearing 6. Thus, the operation effect produced by forming the bearing retainer structure at low cost may be significant in a case where an impregnated bearing is employed as the bearing 6.

Furthermore, in a case where an impregnated bearing is employed as the bearing 6a and where the bearing retainer structure is not equipped, the commutator 15 may make contact with the bearing 6a, and oil may adhere onto the commutator 15. Consequently, the oil may cause short circuit. To the contrary, according to the present disclosure, the bearing retainer structure is provided to include the projected piece 9 as a core component, thereby to regulate movement of the bearing 6 and the rotor 12 steadily. In this way, the commutator 15 is restricted from making contact with the bearing 6a. Thus, occurrence of short circuit can be avoided at low cost.

According to the present disclosure, the end of the bearing 6 on the one side in the axial direction is projected from the axial hollow 8 toward the one side in the axial direction. The present configuration facilitates adjustment of the distance between the worm gear unit 5 and the bearing 6 in the axial direction. Therefore, in consideration of movement of the worm gear unit 5 toward the other side in the axial direction due to application of the thrust load, the distance between the worm gear unit 5 and the bearing 6 in the axial direction can be adjusted with high accuracy.

Second Embodiment

Figure 3:
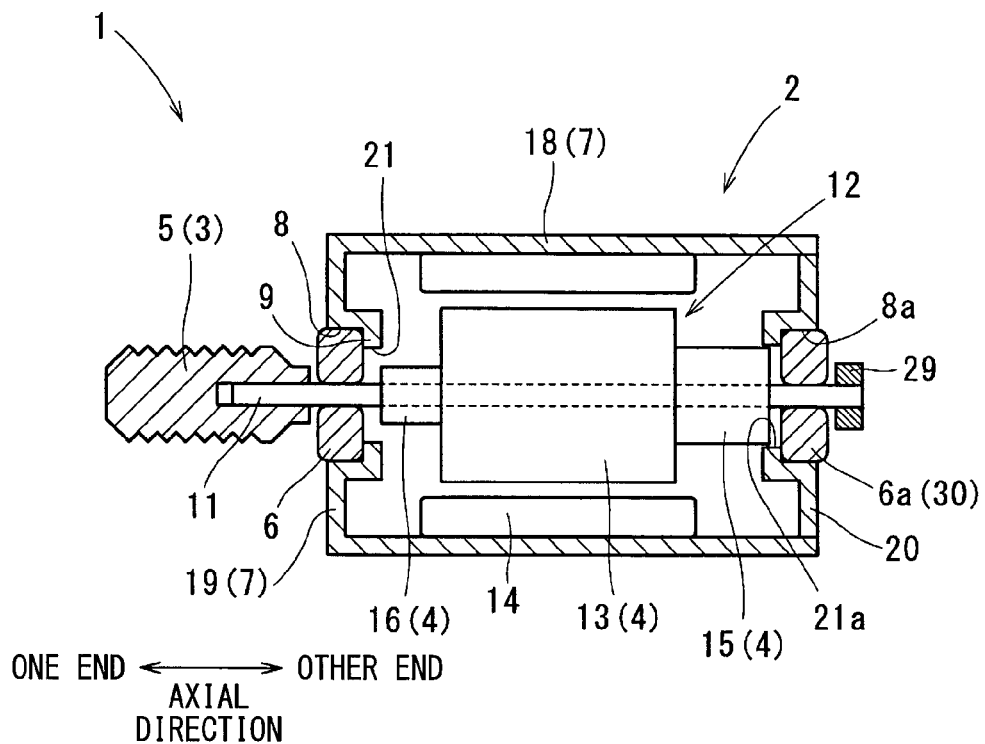
FIG. 3 is a partial sectional view showing an electric actuator according to a second embodiment.
Figure 4:
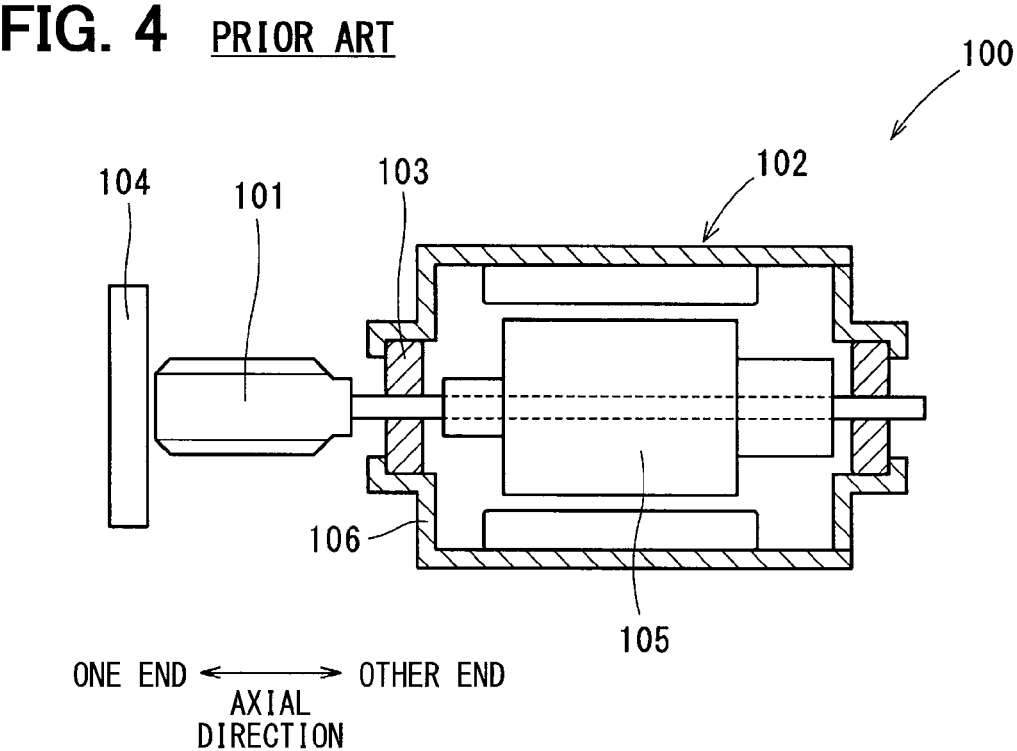
FIG. 4 is a partial sectional view showing an electric actuator according to a prior art.

As shown in FIG. 3, the actuator device 1 according to the second embodiment includes an enlarged piece 29 and a contacted portion 30. The enlarged piece 29 is equipped to a portion of the output shaft 11, which is projected from the motor rotation unit 4 to the other side in the axial direction. The enlarged piece 29 is enlarged in the radial direction. The enlarged piece 29 is integrated with the output shaft 11 by, for example, welding or the like.

The contacted portion 30 is stationary relative to the yoke 7. When the thrust load is transmitted to the worm gear unit 5, the output shaft 11 may move toward the one side in the axial direction accordingly. Consequently, the enlarged piece 29 may make contact with the contacted portion 30. In the actuator device 1 according to the second embodiment, the contacted portion 30 may function as the bearing 6a. In the end bell 20 according to the second embodiment, the hollow 8a is dented toward the one side in the axial direction and opened on the other side in the axial direction. The bearing 6a is press-fitted in the hollow 8a. The end of the bearing 6a on the other side in the axial direction is projected from the hollow 8a to the other side in the axial direction.

In the present configuration, the bearing 6a functions as the contacted portion 30. In addition, the enlarged piece 29 makes contact with the end of the bearing 6a on the other side in the axial direction, thereby to regulate movement of the output shaft 11 toward the one side in the axial direction. The present configuration enables to regulate movement of the worm gear unit 5 and the output shaft 11 toward the one side in the axial direction due to application of the thrust load, without the regulating member 27 (FIG. 1), which is the separate component from the actuator device 1. Consequently, the present configuration according to the second embodiment enables to regulate movement of the output shaft 11 and the worm gear unit 5 at lower cost and with a small space.

(Modification)

The actuator device 1 is not limited to the above-described embodiments and may employ various modifications. For example, in the actuator device 1 according to the embodiments, the electric motor 2 is a small-sized direct-current brushed motor. It is noted that, the electric motor 2 may employ another kind of motor such as a small-sized direct-current brushless motor. In the above embodiments, an impregnated bearing is employed as the bearing 6 in consideration of a manufacturing cost. It is noted that, a bearing other than an impregnated bearing may be employed the bearing 6.

As described above, the electric actuator includes the motor rotation unit, the worm gear unit, the bearing, the yoke, the axial hollow, and the projected piece. The motor rotation unit is integrated with the output shaft of the electric motor to form the rotor of the electric motor. The worm gear unit is fitted to the portion of the output shaft, which is projected from the motor rotation unit to the one side in the axial direction. The worm gear unit receives a thrust load from the worm wheel in the axial direction. The bearing is located between the motor rotation unit and the worm gear unit in the axial direction. The bearing supports the output shaft rotatably. The bearing is contacted with the worm gear unit when the worm gear unit moves to the other side in the axial direction due to application of the thrust load transmitted to the worm gear unit.

The yoke includes the bottom portion, which surrounds the motor rotation unit at the one side in the axial direction. The bottom portion has the shaft hole through which the output shaft passes. The axial hollow is the hollow (dent) formed in the bottom portion. The axial hollow is configured to receive the bearing, which is accommodated in the axial hollow by press-fitting. The axial hollow is formed by press working to be coaxial with the shaft hole. The axial hollow opens to the one side in the axial direction. The projected piece is a part of the yoke. The projected piece is formed simultaneously with the axial hollow in the press working, which is to form the axial hollow. The projected piece is projected toward the inner circumferential periphery of the axial hollow. The projected piece defines the inner circumferential periphery of the shaft hole. The projected piece is located between the motor rotation unit and the bearing in the axial direction.

The present configuration forms the bearing retainer structure, in which the projected piece retains the bearing on the side of the motor rotation unit. In addition, the axial hollow and the projected piece can be formed as the core component of the bearing retainer structure by the press working. Therefore, the bearing retainer structure can be produced without a large increase in manufacturing cost. In this way, without large increase in manufacturing cost, the bearing retainer structure can be equipped to the worm-gear type electric actuator, in which the worm gear unit makes contact with the bearing of the motor to regulate movement of the worm gear unit in the axial direction.

The bearing has the one end in the axial direction, and the one end of the baring is projected from the axial hollow to the one side in the axial direction. The present configuration facilitates adjustment of the distance between the worm gear unit and the bearing in the axial direction. Therefore, in consideration of movement of the worm gear unit toward the other side in the axial direction due to application of the thrust load, the distance between the worm gear unit and the bearing in the axial direction can be adjusted with high accuracy.

According to the second embodiment, the output shaft is projected from the motor rotation unit to the other side in the axial direction. In addition, the electric actuator includes the enlarged piece and the contacted portion. The enlarged piece is equipped to the portion of the output shaft, which is projected from the motor rotation unit to the other side in the axial direction. The enlarged piece is enlarged in the radial direction. The contacted portion is stationary relative to the yoke. The enlarged piece makes contact with the contacted portion when the output shaft moves toward the one side in the axial direction due to transmission of the thrust load to the worm gear unit.

The present configuration enables to impose regulation on movement of the worm gear unit and the output shaft to the one side in the axial direction due to transmission of the thrust load, without an additional component to the electric actuator. Consequently, the present configuration enables to regulate movement of the output shaft and the worm gear unit at lower cost and with a small space.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An electric actuator comprising:
   a motor rotation unit integrated with an output shaft of an electric motor to form a rotor of the electric motor;
   a worm gear unit fitted to a first portion of the output shaft, the first portion being projected from the motor rotation unit to one side in an axial direction, the worm gear unit configured to receive thrust load from a worm wheel in the axial direction;
   a bearing located between the motor rotation unit and the worm gear unit in the axial direction and configured to support the output shaft rotatably, the bearing further configured to, when the worm gear unit receives the thrust load and thereby is moved toward an other side in the axial direction, collide with the worm gear unit to restrict the worm gear unit from moving toward the other side in the axial direction;
   a yoke having a bottom portion, the bottom portion surrounding the motor rotation unit on the one side in the axial direction and having a shaft hole through which the output shaft passes;
   an axial hollow being a dent formed by press working in the bottom portion to be coaxial with the shaft hole and to open on the one side in the axial direction, the axial hollow press-fitted with the bearing to accommodate the bearing; and
   a projected piece being a part of the yoke and formed by the press working simultaneously with the axial hollow, the projected piece projected toward the output shaft to define an inner circumferential periphery of the shaft hole, the projected piece being located between the motor rotation unit and the bearing in the axial direction.

2. The electric actuator according to claim 1, wherein the bearing has one end in the axial direction, the one end being projected from the axial hollow to the one side in the axial direction.

3. The electric actuator according to claim 1, wherein
   the output shaft is projected from the motor rotation unit to the other side in the axial direction,
   the electric actuator further comprising:
   an enlarged piece equipped to a second portion of the output shaft, the second portion being projected from the motor rotation unit to the other side in the axial direction, the enlarged piece being enlarged in the radial direction; and
   a contacted portion being stationary relative to the yoke, the contacted portion configured to, when the worm gear unit receives the thrust load and applies the thrust load to the output shaft to move the output shaft toward the other side in the axial direction, collide with the enlarged piece.

4. The electric actuator according to claim 1, wherein
   the worm gear unit includes a worm gear unit surface facing the other side in the axial direction,
   the bearing includes a bearing surface facing the one side in the axial direction, and
   the worm gear unit surface collides with the bearing surface when the worm gear unit is moved toward the other side in the axial direction.

5. The electric actuator according to claim 1, wherein
   a thrust clearance is defined between the bearing and the motor rotation unit, and
   when the worm gear unit collides with the bearing, the projected piece is configured to maintain the thrust clearance between the bearing and the motor rotation unit.

* * * * *